(12) United States Patent  
Ota et al.

(10) Patent No.: US 8,982,188 B2
(45) Date of Patent: Mar. 17, 2015

(54) RUNNING-ENVIRONMENT RECOGNITION APPARATUS

(75) Inventors: Ryo Ota, Tokyo (JP); Toshiya Oosawa, Yokohama (JP); Akira Takahashi, Sagamihara (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 401 days.

(21) Appl. No.: 13/283,011

(22) Filed: Oct. 27, 2011

(65) Prior Publication Data

US 2012/0140039 A1    Jun. 7, 2012

(30) Foreign Application Priority Data

Dec. 7, 2010   (JP) .................................. 2010-272104

(51) Int. Cl.
*H04N 13/02* (2006.01)
*B60W 30/12* (2006.01)
*H04N 7/18* (2006.01)

(52) U.S. Cl.
CPC ........... *B60W 30/12* (2013.01); *B60W 2420/42* (2013.01); *B60W 2550/142* (2013.01); *B60W 2550/143* (2013.01); *B60W 2550/146* (2013.01)
USPC .......................................... 348/46; 348/148

(58) Field of Classification Search
CPC .......... H04N 13/0239; H04N 13/0055; H04N 13/0296; H04N 13/0497; H04N 13/0242; H04N 7/18; H04N 13/02; B60R 1/00; B60W 40/072; G06F 17/10; G06F 17/50; G06K 9/00; B60Q 1/00; G08G 1/00

USPC .......... 348/46, 148, E13.074, E13.075, 6, 51, 348/57; 342/70; 701/301, 45; 340/435; 703/1, 45; 382/104, 106

See application file for complete search history.

(56) References Cited

U.S. PATENT DOCUMENTS

| 6,477,260 | B1 * | 11/2002 | Shimomura ................. 382/106 |
| 6,538,579 | B1 * | 3/2003 | Yoshikawa et al. ........... 340/928 |
| 2003/0069695 | A1 * | 4/2003 | Imanishi et al. .............. 701/301 |
| 2004/0105579 | A1 * | 6/2004 | Ishii et al. ..................... 382/154 |
| 2008/0273750 | A1 * | 11/2008 | Fujimoto ...................... 382/103 |
| 2009/0092334 | A1 * | 4/2009 | Shulman et al. .............. 382/284 |
| 2009/0122140 | A1 * | 5/2009 | Imamura ...................... 348/148 |
| 2010/0054538 | A1 * | 3/2010 | Boon ............................ 382/104 |
| 2010/0299109 | A1 * | 11/2010 | Saito ................................ 703/1 |
| 2011/0063097 | A1 * | 3/2011 | Naka et al. .................... 340/435 |

FOREIGN PATENT DOCUMENTS

JP        2009-286222 A    12/2009

* cited by examiner

*Primary Examiner* — Dave Czekaj
*Assistant Examiner* — Dramos I Kalapodas
(74) *Attorney, Agent, or Firm* — Foley & Lardner LLP

(57) ABSTRACT

A running-environment recognition apparatus includes an information recognition section mounted in a vehicle and configured to recognize an information of at least a frontward region of the vehicle relative to a traveling direction of the vehicle; and a road-surface calculating section configured to calculate a road surface of a traveling road and a portion lower than the road surface in the frontward region of the vehicle, from the information recognized by the information recognition section.

25 Claims, 9 Drawing Sheets

AT LAST TIME AROUND

AT CURRENT TIME AROUND

SUPERPOSITION

FIG. 19
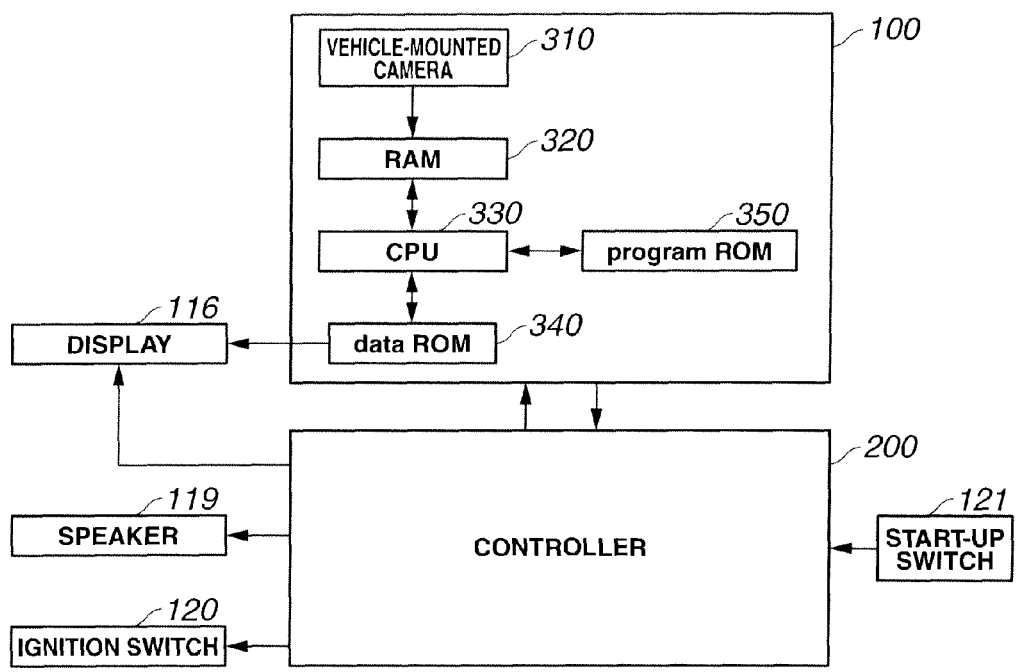
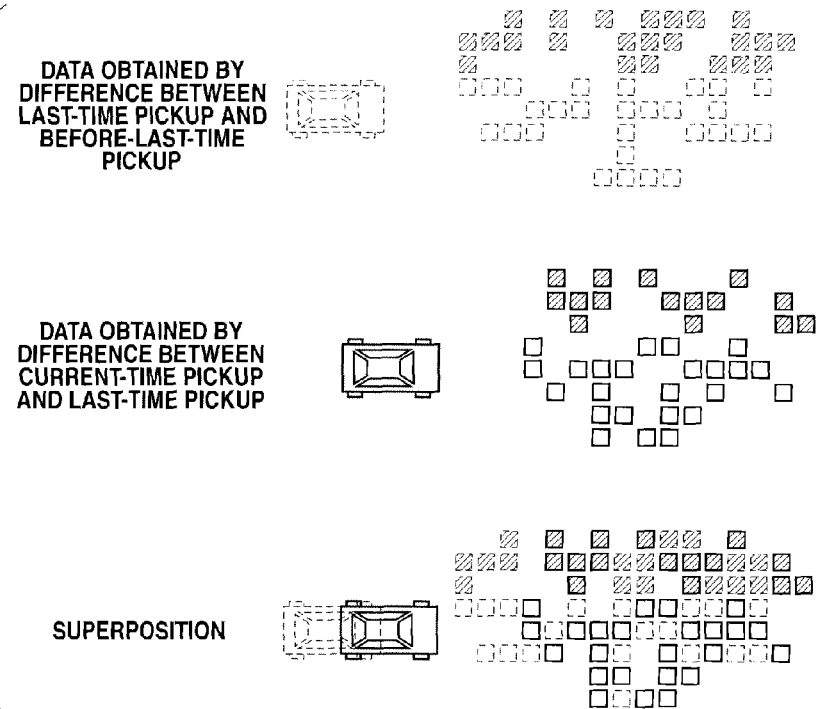
FIG. 20

RUNNING-ENVIRONMENT RECOGNITION APPARATUS

BACKGROUND OF THE INVENTION

The present invention relates to a running-environment recognition apparatus configured to recognize a running environment in which a vehicle runs.

Japanese Patent Application Publication No. 2009-286222 discloses a previously-proposed device. In this technique, a height of road surface is detected by sensing specified locations on a lateral side of a vehicle by use of a plurality of ultrasonic sensors.

SUMMARY OF THE INVENTION

However, since the specified locations on the lateral side are monitored in the above previously-proposed technique, a frontward region and a distant region ahead of the vehicle cannot be sensed. An improvement of safety on vehicle control is not sufficiently attained in the above previously-proposed technique.

It is an object of the present invention to provide a running-environment recognition apparatus devised to recognize a running environment more accurately.

According to one aspect of the present invention, there is provided a running-environment recognition apparatus comprising: an information recognition section mounted in a vehicle and configured to recognize an information of at least a frontward region of the vehicle relative to a traveling direction of the vehicle; and a road-surface calculating section configured to calculate a road surface of a traveling road and a portion lower than the road surface in the frontward region of the vehicle, from the information recognized by the information recognition section.

According to another aspect of the present invention, there is provided a running-environment recognition apparatus comprising: a camera mounted in a vehicle and configured to recognize an environment of a frontward region of the vehicle relative to a traveling direction of the vehicle; and a road-surface calculating section configured to calculate a boundary portion between a road surface of a traveling road and a portion lower than the road surface around the traveling road, by use of a distance data obtained based on a distance to each object existing in the frontward region of the vehicle from the environment recognized by the camera.

According to still another aspect of the present invention, there is provided a running-environment recognition apparatus comprising: a stereo camera including a plurality of cameras mounted in a vehicle and configured to obtain an image information including a road surface of a traveling road existing in a frontward region of the vehicle relative to a traveling direction of the vehicle, wherein the stereo camera is configured to measure a distance in the image information by means of a parallax that is caused when the plurality of cameras take respective images of an identical object; and a road-surface calculating section configured to recognize a first area that is the road surface of the traveling road and a second area that is a portion lower than the road surface around the traveling road, by use of the distance information measured by the stereo camera, wherein the road-surface calculating section is configured to calculate a boundary portion between the first and second areas as an end of the traveling road.

The other objects and features of this invention will become understood from the following description with reference to the accompanying drawings.

BRIEF DESCRIPTION OF THE DRAWINGS

FIG. 19 is a systematic structural view of a vehicle equipped with a running-environment recognition system in a second embodiment according to the present invention.

FIG. 20 is a schematic view showing a superposition processing of image data in the second embodiment.

DETAILED DESCRIPTION OF THE INVENTION

Figure 1:
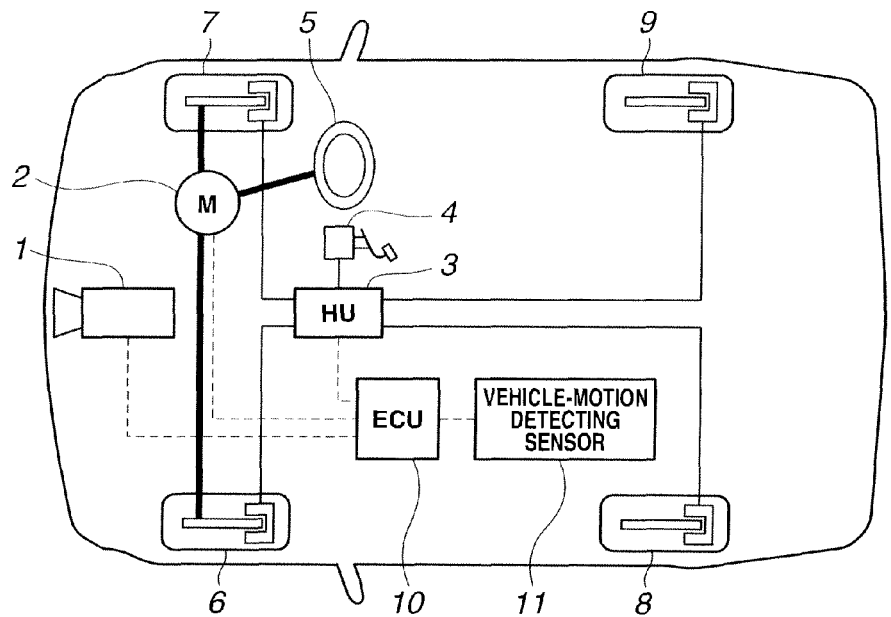
FIG. 1 is a structural view of a vehicle to which a running-environment recognition system in a first embodiment according to the present invention has been applied.

Hereinafter, embodiments according to the present invention will be explained referring to the drawings.

[First Embodiment]

FIG. 1 is a structural view of a vehicle to which a running-environment recognition system in the first embodiment has been applied. The vehicle in the first embodiment includes a running-environment recognition system 1, an electric power steering unit 2, an electric hydraulic brake unit 3, a brake booster 4, a steering wheel 5, a left-front road wheel 6, a right-front road wheel 7, a left-rear road wheel 8, a right-rear road wheel 9, an electronic control unit 10 and a vehicle-motion detecting sensor 11. The running-environment recognition system 1 photographs (takes an image of) a region ahead of the vehicle (host vehicle) and a front portion of the vehicle by using cameras or the like, so that data on the running environment is produced. These cameras are attached to an after-mentioned front-end center location of the vehicle. The electric power steering unit 2 turns (steers) the left and right front wheels 6 and 7 on the basis of a command according to a steering angle of the steering wheel 5, but can turn (steer) the left and right front wheels 6 and 7 independently of the steering angle of the steering wheel 5. The electric hydraulic brake unit 3 independently controls a braking force of each of the four wheels 4-7, in accordance with a brake-manipulating force of driver or in accordance with a vehicle state. The brake booster 4 boosts (increases) the brake-manipulating force of driver, and outputs the boosted brake-manipulating force to the electric hydraulic brake unit 3. The vehicle-motion detecting sensor 11 detects a speed of the vehicle (vehicle velocity), a longitudinal acceleration (front-rear directional acceleration), a lateral acceleration (left-right directional acceleration), a yaw rate, the steering angle, a steering torque and the like. The electronic control unit 10 controls the running-environment recognition system 1, the electric power steering unit 2 and the electric hydraulic brake unit 3 on the basis of respective detection values of the vehicle-motion detecting sensor 11. In a case that the vehicle tends to depart from a lane (a lane boundary line) which is recognized from the image taken by the running-environment recognition system 1, the electronic control unit 10 drives the electric power steering unit 2 and/or the electric hydraulic brake unit 3 as a lane-departure prevention control (or a lane-departure suppressing control). Thereby, yaw moment and/or deceleration are applied to the vehicle so that the vehicle is inhibited from departing from the lane. The electric hydraulic brake unit 3 applies an equal level of braking force to the respective left and right front wheels 6 and 7 and similarly applies an equal level of braking force to the respective left and right rear wheels 8 and 9, when the electric hydraulic brake unit 3 is driven by the brake-manipulating force of driver. On the other hand, at the time of lane-departure prevention control, the electric hydraulic brake unit 3 can apply different levels of braking force respectively to the left and right front wheels 6 and 7 and similarly apply different levels of braking force to the left and right rear wheels 8 and 9, when the electric hydraulic brake unit 3 is driven by the lane-departure prevention control. That is, the electric hydraulic brake unit 3 can cause the braking forces of the left and right front wheels 6 and 7 to become different from each other and also can cause the braking forces of the left and right rear wheels 8 and 9 to become different from each other. Thereby, under the lane-departure prevention control, a yaw moment can be applied to the vehicle. Moreover, if the electric power steering unit 2 receives both of a command derived from the driver manipulation and a command derived from the lane-departure prevention control, the electric power steering unit 2 performs the drive of the left and right front wheels 6 and 7 in accordance with a sum of the driver-manipulation-derived command and the lane-departure-prevention-control-derived command.

(System of Lane-Departure Prevention Control)

Figure 2:
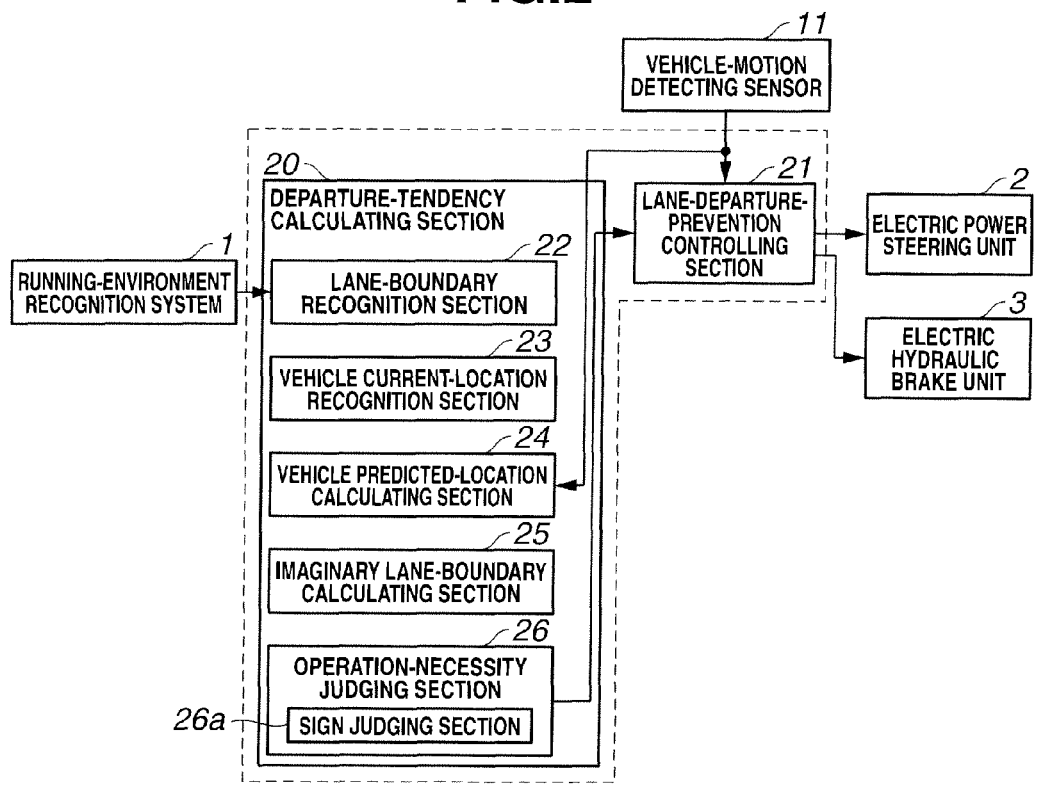
FIG. 2 is a control block diagram of an electronic control unit in the first embodiment.

FIG. 2 is a control block diagram of the electronic control unit 10 in the first embodiment. The electronic control unit 10 includes a departure-tendency calculating section 20 and a lane-departure-prevention controlling section (lane-departure-suppression controlling section) 21. The departure-tendency calculating section 20 calculates a tendency of departure (deviation) from a cruising lane of the vehicle. When the departure-tendency calculating section 20 has detected the departure tendency from the cruising lane of the vehicle, the lane-departure-prevention controlling section 21 drives the electric power steering unit 2 and/or the electric hydraulic brake unit 3 to apply yaw moment and/or deceleration to the vehicle, so that the tendency of the vehicle to depart from the lane is suppressed. It is noted that the lane-departure-prevention controlling section 21 corresponds to a vehicle-state suppressing control section according to the present invention, which performs a vehicle-state suppressing control for suppressing a running state of the vehicle by controlling the running state of vehicle on the basis of a relation between the vehicle and the lane boundary line. The departure-tendency calculating section 20 includes a lane-boundary recognition section 22, a vehicle current-location recognition section (vehicle end-portion recognition section) 23, a vehicle predicted-location calculating section 24, an imaginary lane-boundary calculating section 25, and an operation-necessity judging section 26. The lane-boundary recognition section 22 recognizes lane boundary lines that exist at left and right sides of the lane in which the vehicle is running, from the image of frontward region of (ahead of) the vehicle that is taken by the running-environment recognition system 1. The lane boundary lines are, for example, white lines, guardrails (crash barriers) or curbs. The vehicle current-location recognition section 23 recognizes current locations of two predetermined points of the vehicle. These two predetermined points of the vehicle are preset points existing inside the vehicle or near the vehicle. The two predetermined points of the vehicle are provided respectively for (being compared with) the left and right lane boundary lines. For example, these two predetermined points are right and left end portions of front portion of the vehicle relative to a traveling direction of the vehicle. The vehicle predicted-location calculating section 24 recognizes two predicted locations of the two predetermined points of the vehicle. These predicted locations are locations advanced (displaced forward) from the current locations of the two predetermined points by a predetermined amount in the traveling direction. Specifically, each of these predicted locations is a location at which the predetermined point arrives from the current location when a predetermined time interval has just elapsed. That is, it is predicted that the predetermined point of the vehicle reaches this predicted location when the predetermined time interval has just elapsed from a current time point. This predetermined time interval may be set to be shorter as the speed of vehicle becomes higher. Also, the predicted locations of the two predetermined points of the vehicle are provided respectively for (being compared with) the left and right lane boundary lines, i.e., are set on left and right sides corresponding to the left and right current locations of the two predetermined points.

The imaginary lane-boundary calculating section 25 calculates an imaginary lane boundary line. The imaginary lane boundary line is substantially a tangent at an arbitrary point located on the lane boundary line near the predicted location (of the predetermined point) of the vehicle. The imaginary lane boundary line is calculated for each of the left and right current locations (of the two predetermined points) of the vehicle. That is, the imaginary lane boundary line which is set on the left lane boundary line is given near the left predicted location (of the left predetermined point) of the vehicle, on the other hand, the imaginary lane boundary line which is set on the right lane boundary line is given near the right predicted location (of the right predetermined point) of the vehicle.

The operation-necessity judging section 26 judges whether or not the lane-departure prevention control should be activated, i.e., whether or not an intervention of the lane-departure prevention control should be carried out, on the basis of a relation among the current location of vehicle, the predicted location of vehicle and the imaginary lane boundary line. The operation-necessity judging section 26 includes a sign judging section 26a. The sign judging section 26a calculates a first line and a second line, and judges signs determined by directional properties of these first and second lines with respect to the imaginary lane boundary line. More specifically, the first line is a straight line connecting the imaginary lane boundary line and the current location (of the predetermined point) of the vehicle. The first line is perpendicular to the imaginary lane boundary line and passes through the current location (of the predetermined point) of the vehicle. The second line is a straight line connecting the imaginary lane boundary line and the predicted location (of the predetermined point) of the vehicle. The second line is perpendicular to the imaginary lane boundary line and passes through the predicted location (of the predetermined point) of the vehicle. The frontward-region image taken by the running-environment recognition system 1 is divided (spatially-differentiated) into a cruising-lane-inside region and a cruising-lane-outside region between which the imaginary lane boundary line is sandwiched. If the first and second lines exist in the same one of the cruising-lane-inside region and the cruising-lane-outside region, the above-mentioned sign of the first line is identical with that of the second line. On the other hand, if the first line exists in one of the cruising-lane-inside region and the cruising-lane-outside region and the second line exists in another of the cruising-lane-inside region and the cruising-lane-outside region, the sign of the first line is different from that of the second line. The operation-necessity judging section 26 determines that the lane-departure prevention control is not necessary, if the sign judging section 26a determines that the signs of the first and second lines are identical with each other when the vehicle is running in a region between the left and right imaginary lane boundary lines (i.e., in an imaginary lane defined by the left and right imaginary lane boundary lines). On the other hand, the operation-necessity judging section 26 determines that the lane-departure prevention control is necessary, if the sign judging section 26a determines that the signs of the first and second lines are different from each other when the vehicle is running in the region defined between the left and right imaginary lane boundary lines. That is, it is determined that the lane-departure prevention control is necessary, when the predicted location (of the predetermined point) of the vehicle exists outside the imaginary lane boundary line (i.e., outside the imaginary lane) and also the current location (of the predetermined point) of the vehicle exists inside the imaginary lane boundary line (i.e., inside the imaginary lane). At the times of the other cases, it is determined that the lane-departure prevention control is unnecessary.

The lane-departure-prevention controlling section 21 carries out the lane-departure prevention control when the operation-necessity judging section 26 has determined that the lane-departure prevention control is necessary. On the other hand, the lane-departure-prevention controlling section 21 does not carry out the lane-departure prevention control when the operation-necessity judging section 26 has determined that the lane-departure prevention control is unnecessary.

[Lane-Departure Prevention Control]

Figure 3:
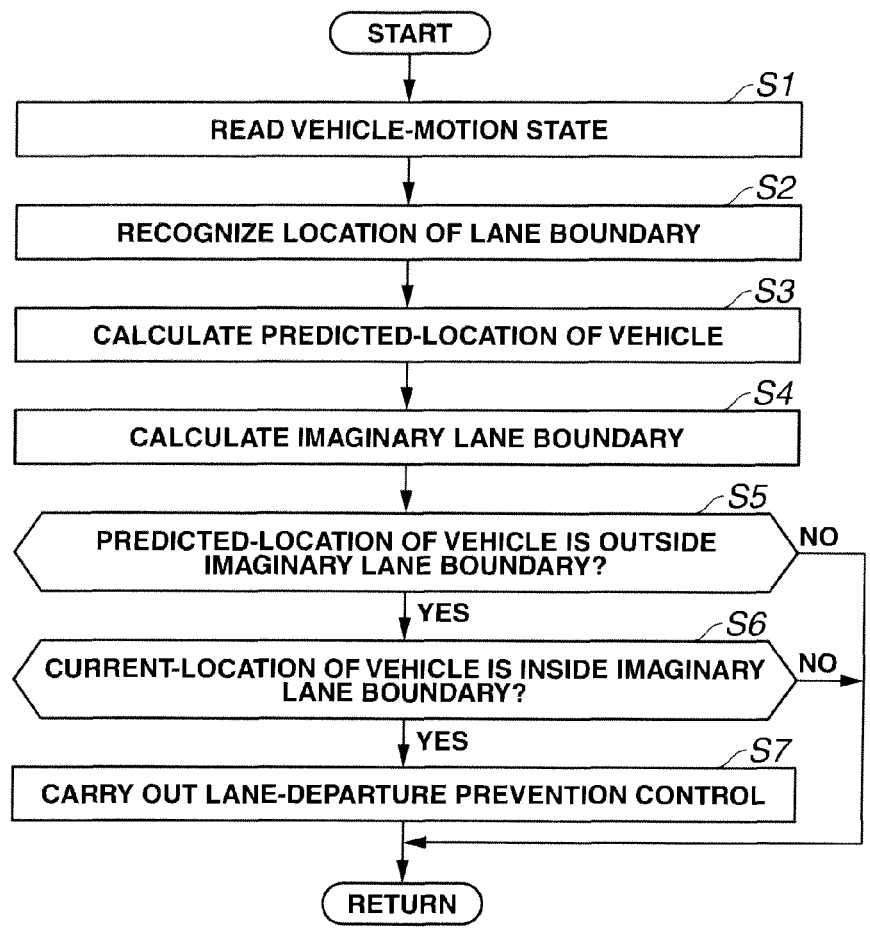
FIG. 3 is a flowchart showing a flow of a lane-departure prevention control in the first embodiment.

FIG. 3 is a flowchart showing a flow of the lane-departure prevention control which is executed in the electronic control unit 10 according to the first embodiment. Respective steps of this flowchart will now be explained. This processing is repeated, for example, with a calculation period of 10 ms (milliseconds) during the running of the vehicle.

At step S1, the lane-departure-prevention controlling section 21 reads the detection values such as the vehicle speed, the longitudinal acceleration, the lateral acceleration, the yaw rate, the steering angle and the steering torque that have been received from the vehicle-motion detecting sensor 11.

Figure 4:
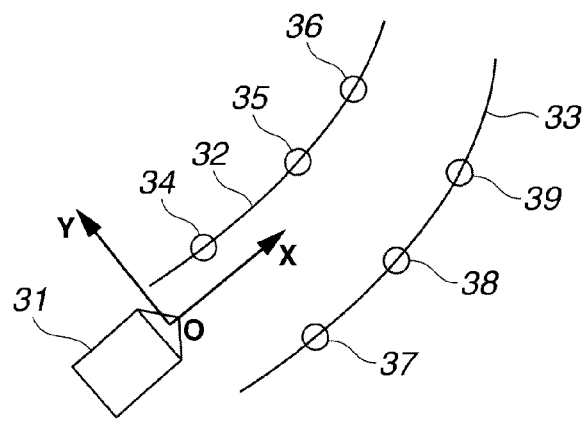
FIG. 4 is a view showing a relation between fixed coordinates of vehicle and left and right lane boundary lines.

At step S2, the lane-boundary recognition section 22 recognizes the location of the (actual) lane boundary line, from the frontward-region image of vehicle received from the running-environment recognition system 1. The location of the (actual) lane boundary line is calculated and represented in fixed coordinates of the vehicle. Also, after-mentioned various locations are basically calculated and represented in the fixed coordinates of the vehicle. For example, as shown in FIG. 4, the fixed coordinates have an origin O, X-axis and Y-axis. The origin O is an attachment location of the running-environment recognition system 1 in the vehicle 31. A traveling direction (moving direction) of the vehicle is defined as the X-axis. A direction perpendicular to the X-axis, namely, a vehicle-width direction is defined as the Y-axis. The left and right lane boundary lines 32 and 33 respectively exist on left and right sides of the lane. In this embodiment, the lane boundary line may be recognized by some representative points 34, 35, 36, 37, 38 and 39 in consideration of calculation load, as shown in FIG. 4.

At step S3, the vehicle current-location recognition section 23 regards two arbitrary points inside or near the vehicle, as the location of the vehicle. The two points regarded as the location of the vehicle are set corresponding to the left and right lane boundary lines, because these two points are compared with the locations of the left and right lane boundary lines as mentioned below. For example, the two points may be a left-front end and a right-front end of the vehicle. Thereby, the vehicle current-location recognition section 23 calculates current locations of the two points (current location of the vehicle). Then, the vehicle predicted-location calculating section 24 calculates a location (of each of the two points) of the vehicle which will be attained when a predetermined time interval has just elapsed from the current location of the vehicle, as a predicted location of the vehicle. At this time, the vehicle predicted-location calculating section 24 calculates the predicted location (of each of the two points) of the vehicle, from the detection values read at step S1 and previously-stored vehicle specifications. That is, the predicted location of the vehicle is calculated based on the vehicle speed, the steering angle, the yaw rate, the vehicle width, a longitudinal length of the vehicle, the attachment locations of the cameras, and the like. Therefore, the two current locations and the two predicted locations of the two points of the vehicle are set corresponding to the left and right lane boundary lines, in order to compare these two current locations and two predicted locations with the locations of the left and right lane boundary lines.

Figure 5A:
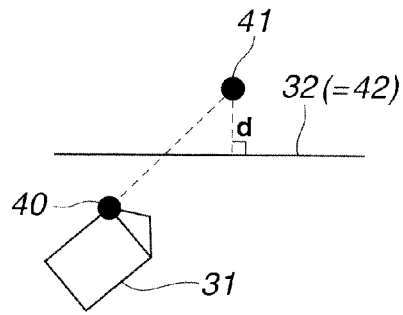
FIGS. 5A to 5C are views each showing an imaginary lane boundary line calculated from the lane boundary line.
Figure 5B:
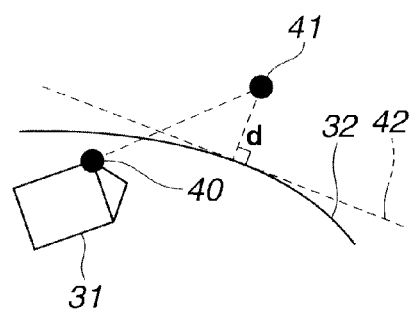
Figure 5C:
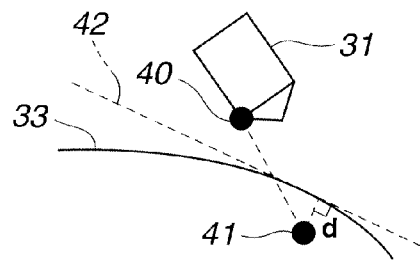
Figure 6A:
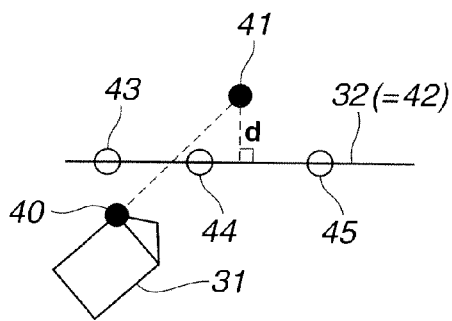
FIGS. 6A to 6C are views each showing an imaginary lane boundary line calculated from representative points representing the lane boundary line.
Figure 6B:
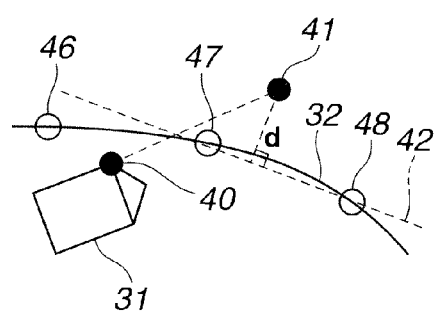
Figure 6C:
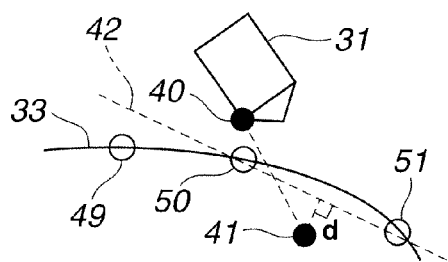

At step S4, the imaginary lane-boundary calculating section 25 calculates an imaginary lane boundary line. The imaginary lane boundary line is a tangent to the lane boundary line which is drawn near the predicted location (of each of the two points) of the vehicle. For example, as shown in FIGS. 5A-5C, each of the imaginary lane boundary lines 42 may be a tangent at a point of the lane boundary line which is closest to the predicted location 41 of the vehicle. This predicted location 41 is a location which the vehicle will reach when a predetermined time interval has just elapsed from the current location 40 of the vehicle. In a case of FIG. 5A, the vehicle 31 has a tendency to depart (deviate) from the left lane boundary line 32 of a straight pathway. In a case of FIG. 5B, the vehicle 31 has a tendency to depart from the left lane boundary line 32 located in a radially outer side of a curved pathway (with respect to a curvature center of the curved pathway). In a case of FIG. 5C, the vehicle 31 has a tendency to depart from the right lane boundary line 33 located in a radially inner side of a curved pathway. Alternatively, in the case that the lane boundary line is represented by several representative points in order to lighten the calculation load, two representative points closest to the predicted location 41 of the vehicle are selected from the several representative points. Then, a straight line passing through these selected two representative points is regarded as the imaginary lane boundary line, as shown in FIGS. 6A-6C. In the case of FIG. 6A, the imaginary lane boundary line is a straight line including (passing through) two representative points 44 and 45. In the case of FIG. 6B, the imaginary lane boundary line is a straight line including two representative points 47 and 48. In the case of FIG. 6C, the imaginary lane boundary line is a straight line including two representative points 50 and 51. A distance between the predicted location 41 of the vehicle and the imaginary lane boundary line 42 is defined as a departure amount (deviation amount) d.

Figure 7A:
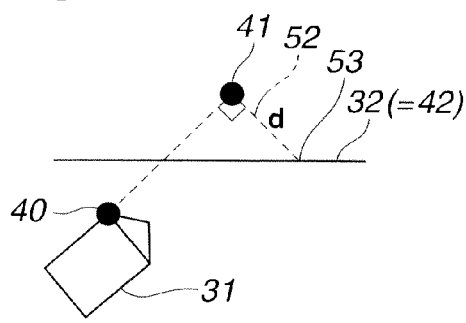
FIGS. 7A to 7C are views each showing an imaginary lane boundary line calculated from the lane boundary line in alternative way.
Figure 7B:
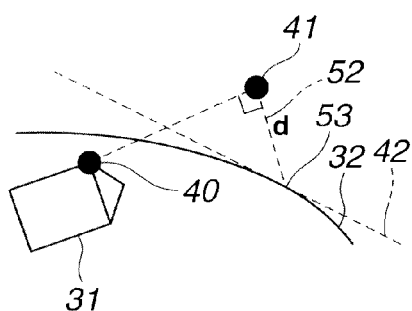
Figure 7C:
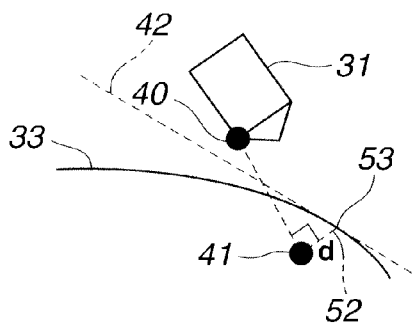
Figure 8A:
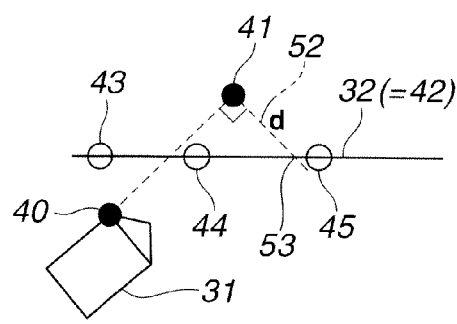
FIGS. 8A to 8C are views each showing an imaginary lane boundary line calculated from representative points representing the lane boundary line in alternative way.
Figure 8B:
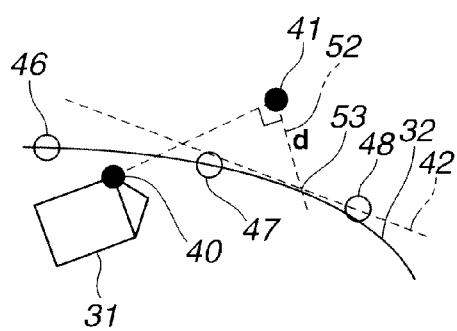
Figure 8C:
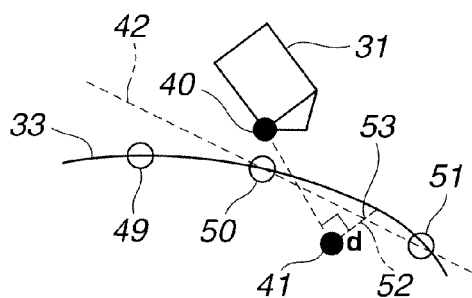

Moreover, as shown in FIGS. 7A-7C, the imaginary lane boundary line 42 may be set as a tangent given at an intersection point 53 located on the lane boundary line 32 (or 33). This intersection point 53 is an intersection between the lane boundary line 32 (or 33) and a straight line 52 which passes through the predicted location 41 of the vehicle and which is perpendicular to the traveling direction of the vehicle. Alternatively, in the case that the lane boundary line is represented by several representative points in order to lighten the calculation load as mentioned above, two representative points closest to the straight line 52 in distance are selected from the several representative points. This straight line 52 passes through the predicted location 41 of the vehicle and is perpendicular to the traveling direction of the vehicle in the same manner as the case of FIGS. 7A-7C. Then, a straight line passing through the selected two representative points is regarded as the imaginary lane boundary line 42, as shown in FIGS. 8A-8C. In the case of FIG. 8A, the imaginary lane boundary line 42 is a straight line including (passing through) two representative points 44 and 45. In the case of FIG. 8B, the imaginary lane boundary line 42 is a straight line including two representative points 47 and 48. In the case of FIG. 8C, the imaginary lane boundary line 42 is a straight line including two representative points 50 and 51. In such cases shown by FIGS. 8A-8C, a distance between the predicted location 41 of the vehicle and the intersection point 53 given between the imaginary lane boundary line 42 and the straight line 52 is defined as the departure amount d.

Since the imaginary lane boundary line 42 is set as explained above, the lane boundary line is identical with (is equal to) the imaginary lane boundary line in the case of straight pathway. On the other hand, in the case of radially outer side of the curved pathway with respect to the curvature center of the curved pathway, the imaginary lane boundary line is calculated so as to exist in a radially outer region beyond the lane boundary line. That is, in this case, the imaginary lane boundary line exists outside the lane (i.e., so as not to exist in the lane defined by the lane boundary line). Still, in the case of radially inner side of the curved pathway with respect to the curvature center of the curved pathway, the imaginary lane boundary line is calculated so as to exist in a radially outer region beyond the lane boundary line. That is, in this case, the imaginary lane boundary line exists inside the lane defined by the lane boundary line. In this embodiment, the calculated imaginary lane boundary line may be rotated, offset or shifted a little, i.e., may be adjusted.

At step S5, the operation-necessity judging section 26 judges whether or not the predicted location (each of the two points) of the vehicle exists outside the imaginary lane boundary line (outside the imaginary lane) calculated at step S4, i.e., whether or not the predicted location of the vehicle exists in the cruising-lane-outside region formed by the imaginary lane boundary line. If the predicted location of the vehicle exists outside the imaginary lane boundary line, i.e., exists in the cruising-lane-outside region defined by the imaginary lane boundary line, the program proceeds to step S6. If the predicted location of the vehicle exists inside the imaginary lane boundary line (inside the imaginary lane), i.e., exists in the cruising-lane-inside region defined by the imaginary lane boundary line, the program is returned.

At step S6, the operation-necessity judging section 26 judges whether or not the current location (each of the two points) of the vehicle exists inside the imaginary lane boundary line (inside the imaginary lane), i.e., whether or not the current location of the vehicle exists in the cruising-lane-inside region defined by the imaginary lane boundary line. If the current location of the vehicle exists inside the imaginary lane boundary line (inside the imaginary lane), the program proceeds to step S7. If the current location of the vehicle exists outside the imaginary lane boundary line (outside the imaginary lane), the program is returned.

At step S7, the lane-departure-prevention controlling section 21 calculates an operation amount (manipulated variable) M by multiplying a gain K by the departure amount d calculated at step S4, as shown in the following formula (1).

$$M = K \times d \tag{1}$$

The lane-departure-prevention controlling section 21 drives the electric power steering unit 2 and/or the electric hydraulic brake unit 3 on the basis of the operation amount M. Thereby, the yaw moment and/or the deceleration is applied to the vehicle so as to perform the lane-departure prevention control.

(Running Environment Recognition System)

Figure 9:
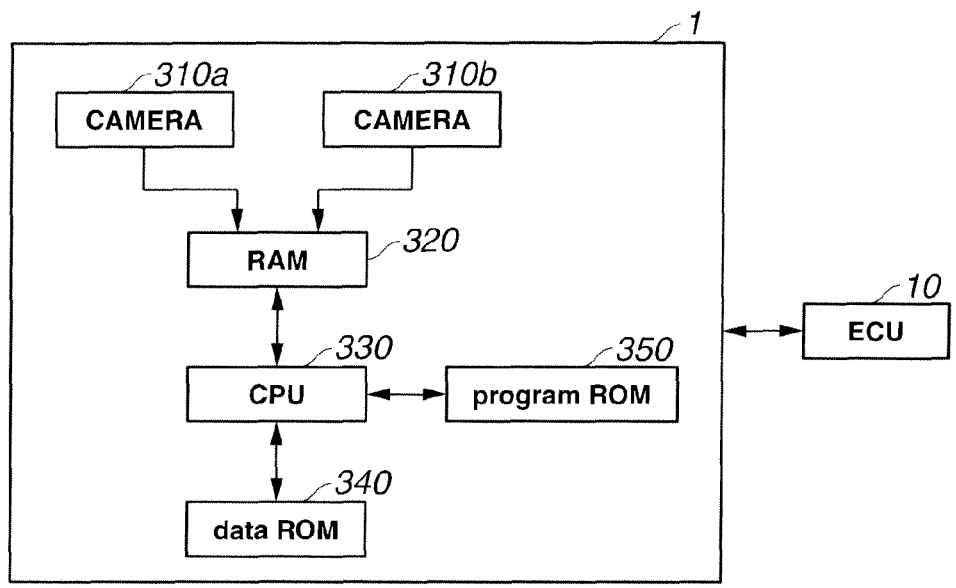
FIG. 9 is a block diagram showing a configuration of the running-environment recognition system in the first embodiment.

Next, the running-environment recognition system will now be explained. FIG. 9 is a block diagram showing a configuration of the running-environment recognition system 1 in the first embodiment. The running-environment recognition system 1 includes a stereo camera constituted by a pair of cameras (a pair of camera lenses) 310a and 310b (hereinafter also referred to as cameras 310) as an image-pickup means. The stereo camera may be constituted by three or more cameras. By use of these cameras 310a and 310b, the running-environment recognition system 1 recognizes an environment around the host vehicle. In the case of the first embodiment, the pair of cameras 310a and 310b are arranged at locations displaced from a center of the vehicle by the same distance in left and right vehicle-width directions. That is, the camera 310a has a distance equal to that of the camera 310b, from the center of vehicle with respect to the vehicle-width direction. In this example, the running-environment recognition system 1 performs a processing for the images taken by these cameras. However, according to the first embodiment, the image processing and the like may be performed by the other controller. It is noted that the pair of cameras 310a and 310b correspond to an information recognition section according to the present invention.

The running-environment recognition system 1 calculates a distance to each object of the image by the principle of triangulation, i.e., by using a disparity (difference) in vision that is caused when the images are taken by the plurality of cameras 310a and 310b (hereinafter referred to as a parallax). For example, a following relation is satisfied.

$$Z=(B \times f)/\delta$$

Wherein Z denotes a distance to the object, B denotes a distance between the pair of cameras 310*a* and 310*b*, f denotes a focal length of each camera 310*a*, 310*b*, and δ denotes the parallax.

The running-environment recognition system 1 includes a RAM 320, a CPU 330, a data ROM 340 and a program ROM 350. The RAM 320 memorizes the images picked up by the cameras 310. The CPU 330 performs arithmetic processing. The data ROM 340 stores various data. The program ROM 350 stores programs of the recognition processing. The cameras 310 are attached to a rearview mirror mounted in an interior of the vehicle. Each of the cameras 310 takes (picks up) an image of frontward ambience of the vehicle at a predetermined depression angle from the predetermined attachment location of this camera 310. The vehicle-frontward-region image taken by the camera 310 is inputted into the RAM 320. Then, a lane(s) and a three-dimensional object(s) existing ahead of the vehicle are detected from the vehicle-frontward-region images, and a shape of road is estimated from the vehicle-frontward-region images. It is noted that the running-environment recognition system 1 corresponds to the road-surface calculating section according to the present invention.

Figure 10:
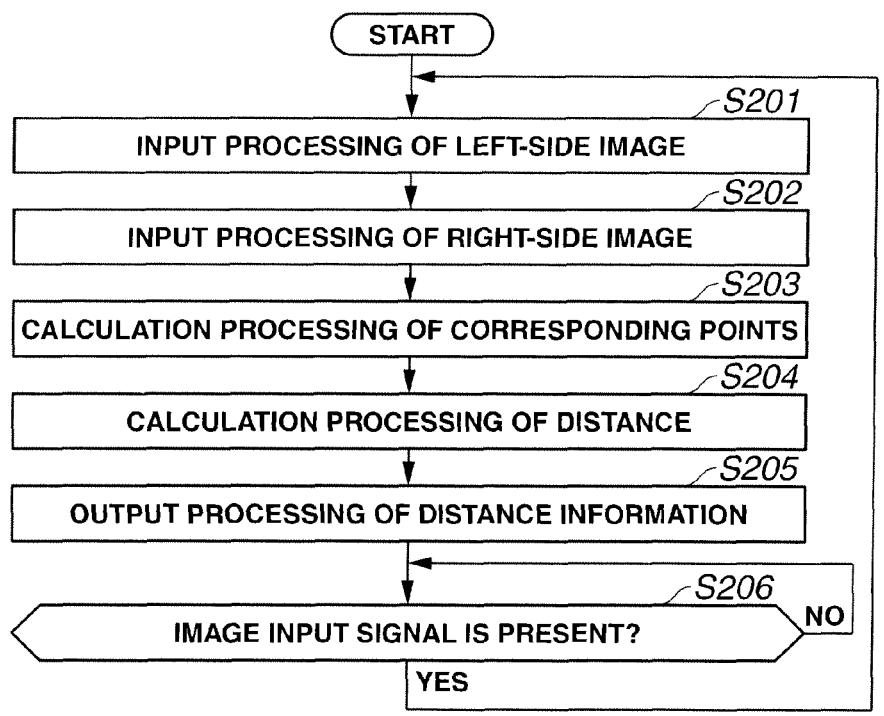
FIG. 10 is a flowchart showing an image processing which is executed by the running-environment recognition system in the first embodiment.

FIG. 10 is a flowchart showing an image processing which is executed by the running-environment recognition system in the first embodiment. At step S201, the image of the camera 310*a* provided on the left side is inputted (into the RAM 320). At step S202, the image of the camera 310*b* provided on the right side is inputted. At step S203, a corresponding point(s) of the image is calculated. At step S204, a distance to the calculated corresponding point is calculated. At step S205, an information on the distance is outputted. At step S206, it is judged whether an input signal of image is present or absent. If the input signal of image exists, the program returns to step S201 so that the flow of FIG. 10 is repeated. If the input signal of image does not exist, the arithmetic processing is terminated so that the program becomes and remains on standby until the input signal of image occurs.

(Recognition Processing on Road Having Steep Slope)

Figure 11:
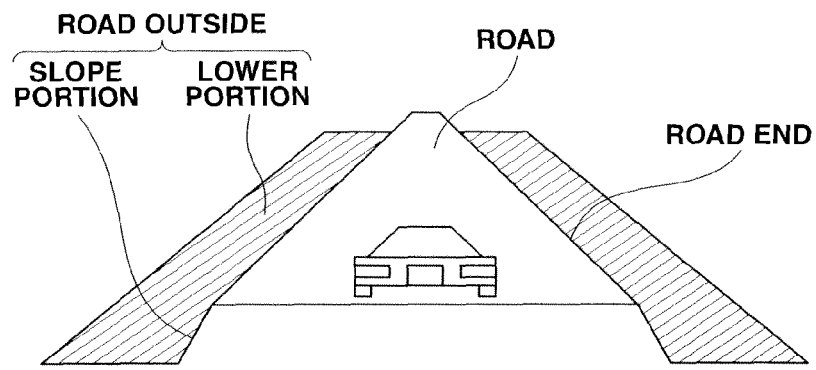
FIG. 11 is a schematic view showing a bank road constructed by steep slope portions.
Figure 12:
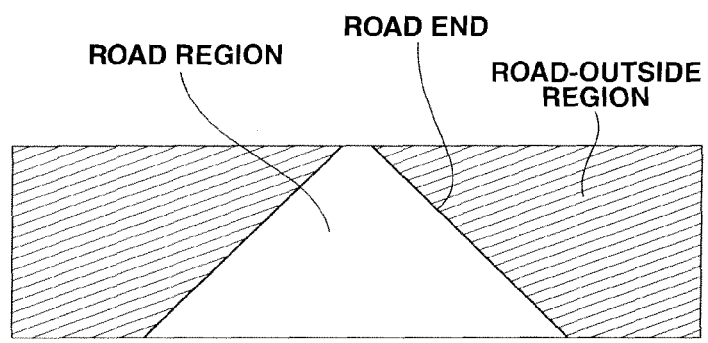
FIG. 12 is an image showing a schematic picture obtained when the bank road constructed by the steep slope portions is photographed from the vehicle.

An image processing will now be explained in a case that an outside of the road (e.g., both sides laterally outside of the road in which the vehicle is running) is lower than a surface of the road. FIG. 11 is a schematic view showing a bank road (mound road) constructed by both steep slope portions. This bank road is formed substantially in a trapezoidal shape in cross section taken along a plane perpendicular to an extending direction of the bank road. The road surface is formed at an upper base portion (upper edge portion) of this trapezoidal shape. The slope portion is formed at a region between the road surface (i.e., the road-inside region) and the outside region of the road. Both the outside regions of the road (both sides laterally outside the road) are lower than the road-inside region and the slope portions. Hereinafter, the road is also called the road surface. FIG. 12 is an obtained image showing a schematic picture obtained when the bank road constructed by the steep slope portions is photographed from the vehicle. In this image, both ends of the road abut on (are adjacent to) the road-outside regions (i.e., the lower-level regions lower than the road surface). In the case of this road, an angle of the slope is larger than the depression angle of the camera 310 because the slope has a steep inclination. Hence, blind spots (i.e., spots not-photographed due to dead angle) are produced at the slope portions. Therefore, the slope portions do not exist on the taken images. Hence, each road end is in contact with the road-outside region (the lower-level region) on the taken image. Accordingly, in this case, the road-inside region and the region representing the other lower parts are detected on the image. Thereby, a road-side point of a boundary portion between the road-inside region and the region representing the other lower parts on the image is extracted as an actual road end (one of actual both ends of the road). Thereby, the detection processing can be achieved in conformance with an actual road environment.

(Accuracy Improvement of Image Processing)

Figure 13:
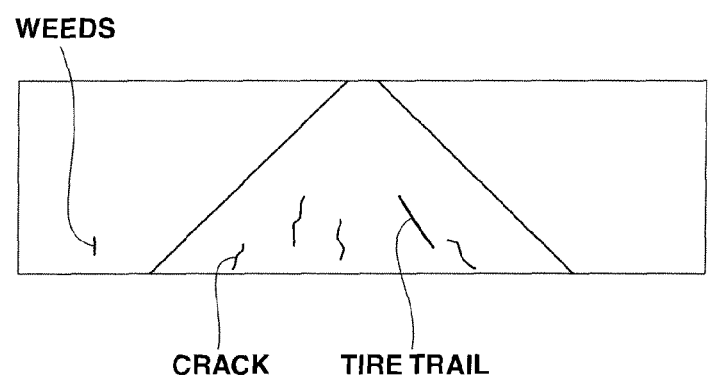
FIG. 13 is a schematic view showing characteristic points which are taken concurrently when an actual road is photographed.

In a case that the road-inside region or the road-outside region is completely homogeneous in vision, it is difficult to extract spots belonging to the identical region from the respective images taken by the two cameras. FIG. 13 is a schematic view showing characteristic points which are taken concurrently when the actual road is photographed. As shown in FIG. 13, the actual road includes grains of asphalt concrete used for a pavement, a pavement marking, a joint of the pavement, cracks of the pavement, a tire trail produced by vehicles and the like, as visually characteristic parts throughout the road, in a case of paved road. Even in a case of not-paved road, the actual road includes the visually characteristic parts such as ruts throughout the actual road. It is noted that the road-inside region corresponds to a first area having a first visually-characteristic point according to the present invention. Moreover, in the region lower than the road, visually characteristic parts such as weeds exist throughout the lower-level region. It is noted that the region lower than the road corresponds to a second area having a second visually-characteristic point according to the present invention. That is, while the road surface has been paved or leveled off for the traveling of vehicles, the region lower than the road surface has not been paved or leveled off. Hence, there is a visual difference between the road surface and the region lower than the road surface so that there is a high possibility that a boundary portion between the road surface and the region lower than the road surface becomes visually characteristic. Thus, multiple visually-characteristic points exist in the road, the road-outside region, and the boundary region between the road and the road-outside region. Hence, the images taken by the two cameras 310 are compared with each other about each characteristic point, and thereby, a direction and a distance to the each characteristic point from the camera 310 are calculated. Hence, a location of each characteristic point can be obtained. Accordingly, an aggregation of characteristic points actually existing on the road can be regarded as lying substantially in a same plane, and also, the characteristic points actually existing on the portion lower than the road can be regarded as being located in the road-outside region.

(Superposition Processing)

Figure 14:
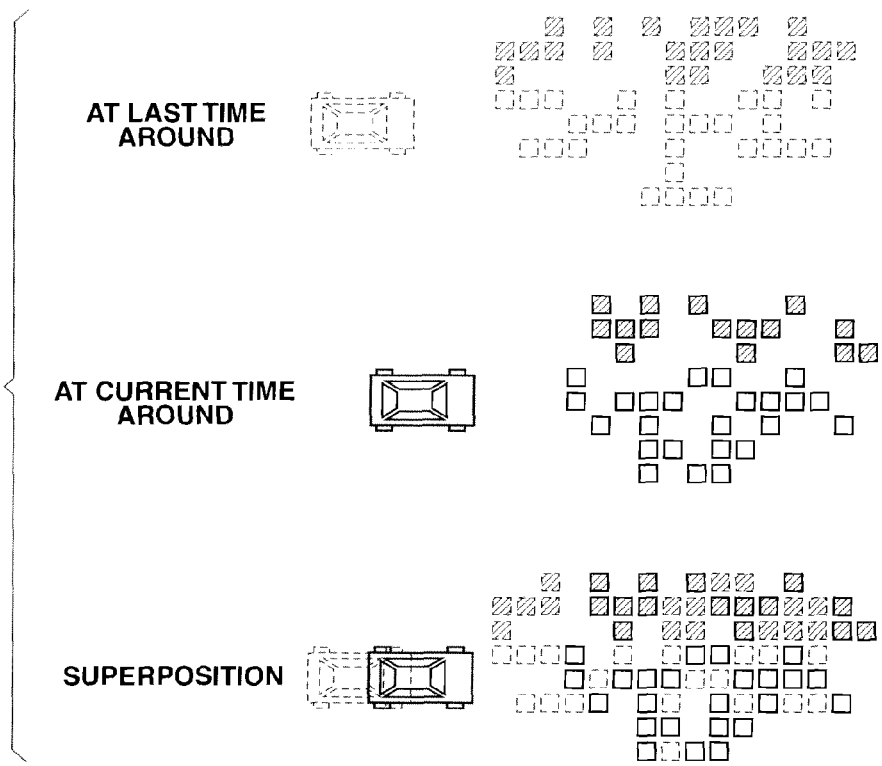
FIG. 14 is a schematic view showing a superposition processing of image data in the first embodiment.

In order to obtain the shape of road surface, the characteristic parts such as traffic marking paints, small cracks of asphalt and tire trails which exist in the road surface are extracted from the vehicle-frontward images taken by the cameras 310. Then, a distance of each of the extracted characteristic parts from the camera 310 is measured by a location difference (deviation) of the each characteristic part between in the images taken by the two cameras 310. However, such characteristic parts do not necessarily exist evenly in whole of the road surface. Moreover, even if such characteristic parts exist in whole of the road surface, it is not clear that these characteristic parts are always able to be detected. In the same manner, also in the region lower than the road surface, it is not clear that the characteristic parts are always able to be detected in whole of the region lower than the road surface. Hence, it is necessary to further improve the accuracy. Therefore, in this embodiment, the obtained distance data is accumulated in the data ROM 340. This accumulated distance data is superimposed on a distance data obtainable by images that are taken at a next-time around (next timing) or later. It is noted that the data ROM 340 corresponds to a distance-data accumulation section according to the present invention. FIG. 14 is a schematic view showing a superposition processing of the image data (distance information) in the first embodiment. For example, parts which can be recognized from images taken in the last-time around (or previous time around) are superimposed on parts which can be recognized by images taken in the current-time around. That is, some parts whose distance information could not obtained from the images taken in the last-time around can have those distance information since those distance information are newly obtained from the images taken in the current-time around. Thereby, a detection accuracy of the road and the surrounding environment can be enhanced. As shown in FIG. 14, even if the host vehicle is moving, a plurality of images obtained with time include a same region (i.e., overlapped region) in a case where the vehicle speed is relatively low, i.e., in a case where a vehicle movement between two photographing timings is relatively short. Therefore, an information about such an overlapped region is superimposed among the plurality of images obtained with time. In this embodiment, the number of superimpositions is not limited to two times. A possible many number of superimpositions is effective.

If a distance data of a certain spot which is included in the overlapped region and which has been obtained from the images taken at a first timing is different from a distance data of this certain spot which has been obtained from the images taken at a second timings, a priority may be given to the distance data obtained at a newer one of the first and second timings. Thereby, a recognition accuracy can be enhanced because of the usage of new data. Alternatively, an average of the data obtained at the first timing and the data obtained at the second timing (or average data among multiple timings) may be employed. Thereby, an influence of disturbance and the like included in the data can be eliminated so that a stable recognition is attained. Still alternatively, a disparity-smaller one of the data obtained at the first timing and the data obtained at the second timing (or among multiple timings) as compared with surrounding data may be employed. Thereby, the arithmetic calculation can be done based on a stable data so that the recognition accuracy is improved. Although various processing methods can be cited as mentioned above, any one or combination of such processing methods may be used.

(Recognition Processing for Road End)

Figure 15:
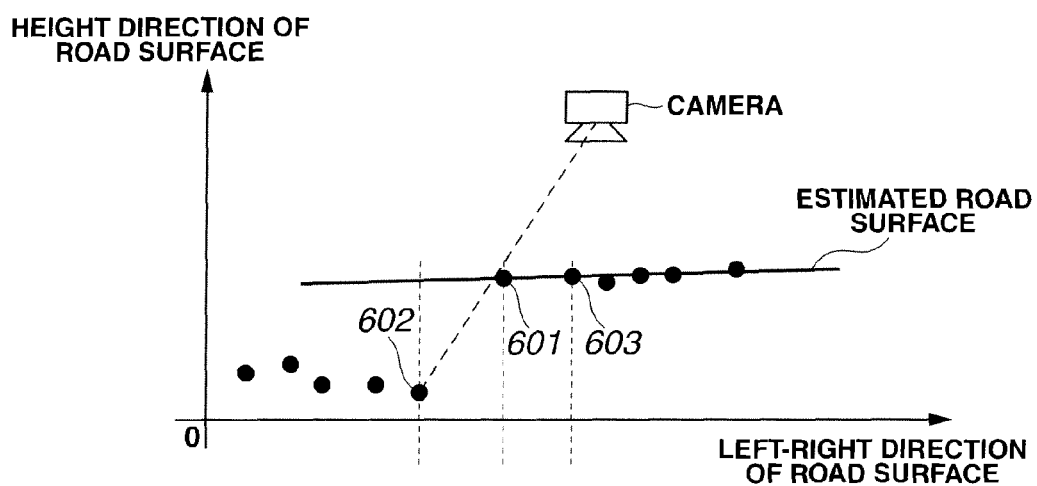
FIG. 15 is a schematic view showing a result recognized by taking images of the bank road, relative to a cross direction of the road, in the first embodiment.

FIG. 15 is a schematic view showing a result recognized by taking images of the bank road, relative to a cross direction of the road. In this case, the slope portion is steep so that there is a dead angle (causing blind spots) of the camera. Hence, the slope is not viewed in the taken images. In these images (pictures), the road portion is in direct contact with the portion lower than the road. Specifically, a point (spot) 601 which is located in an end portion of the road and a point (spot) 602 which is located outside the road are adjacent to (approximately abut on) each other on the image. However, actually, as shown in FIG. 15, the point 601 is not adjacent to (does not abut on) the point 602, but is located somewhat away from the point 602. Therefore, because it is not accurate to output the point 602 as an end point of the road, the 601 is outputted as the end point of the road.

In FIG. 15, for example, assuming that the data of location corresponding to the point 601 has not been detected and that a point (spot) 603 which exists at a more inside location of the road than the point 601 has been detected as an endmost point which exists in the road surface, the following procedure is conducted. In this case, the taken image includes a not-recognized region between (a point corresponding to) the point 602 and (a point corresponding to) the point 603. Hence, a place where the road end is located between the point 602 and the point 603 is not clear. However, since the point 602 existing in the region lower than the road surface has been detected, it can be estimated that the road does not exist on a view line along which the camera 31 looks down upon the point 602. Therefore, it can be estimated that the road end exists at least between the point 603 and the point 601 (which has not been detected in this case but is obtainable from the above-mentioned view line). Accordingly, in this case, a point which is between the point 602 and the point 603 and which exists at a more inside location of the road than a location (near the point 601) corresponding to the boundary portion is outputted as the road end.

(Recognition Processing for Road End in a Case of Road constructed by Gentle Slope)

Figure 16:
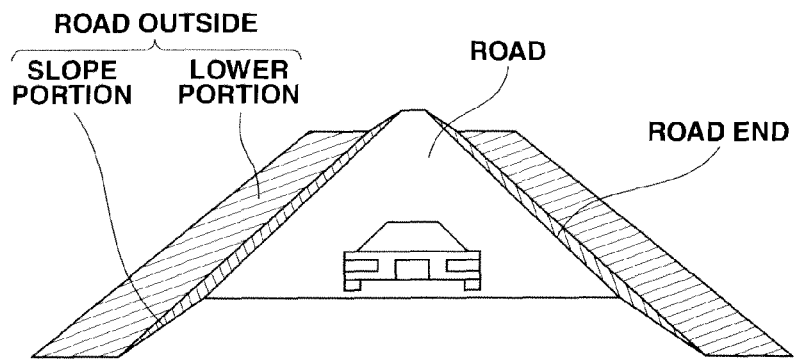
FIG. 16 is a schematic view showing a bank road constructed by gentle slope portions.
Figure 17:
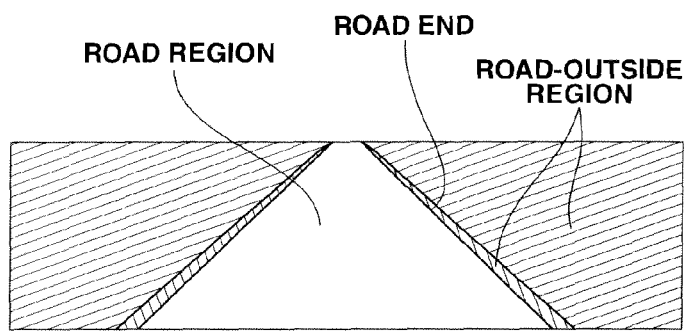
FIG. 17 is an image showing a schematic picture obtained when the bank road constructed by the gentle slope portions is photographed from the vehicle.

FIG. 16 is a schematic view showing a bank road (mound road) constructed by gentle slope portions. This bank road is formed substantially in a trapezoidal shape in cross section taken along a plane perpendicular to an extending direction of the bank road. The road surface is formed at an upper base portion (upper edge portion) of this trapezoidal shape. The slope portion is formed at a region between the road surface (i.e., the road-inside region) and the outside region of the road. Both the outside regions of the road (both sides laterally outside the road) are lower than the road-inside region and the slope portions. FIG. 17 is a taken image showing a schematic picture obtained when the bank road constructed by the gentle slope portions is photographed from the vehicle. In this image, both ends of the road abut on (are adjacent to) the slope portions, and these slope portions abut on (are adjacent to) the road-outside regions (the lower-level regions lower than the road surface). In the case of this road, an angle of the slope is smaller than the depression angle of the camera 310 because the slope has a gentle inclination. Hence, blind portions (i.e., portions not-photographed due to dead angle) are not produced.

Figure 18:
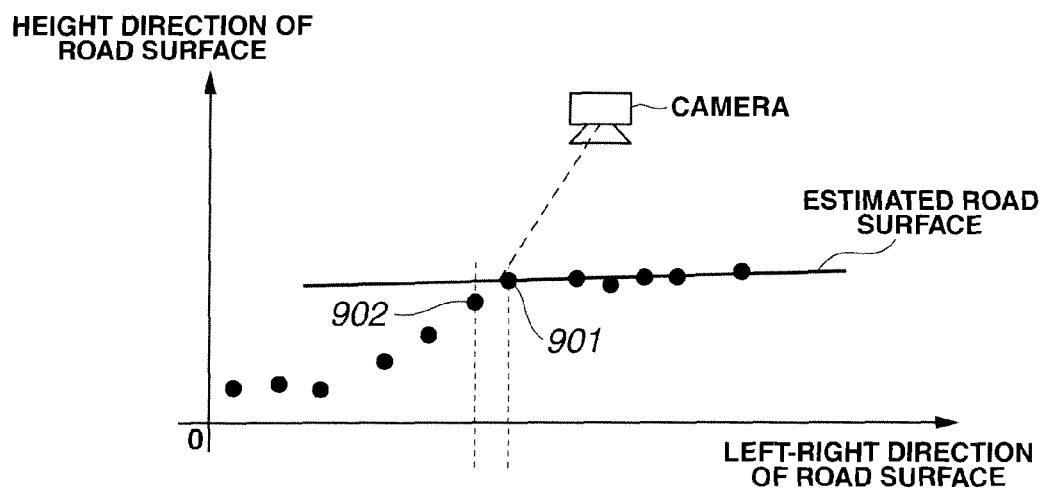
FIG. 18 is a schematic view showing a result recognized by taking images of the bank road, relative to a cross direction of the road.

FIG. 18 is a schematic view showing a result recognized by taking images of the bank road, relative to a cross direction of the road. In this case, the slope portion is gentle and hence is photographed by the camera. Hence, the road portion is in contact with (adjacent to) the slope portion, and the slope portion is in contact with (adjacent to) the road-outside region (the lower-level region) on the taken image. Since it is important to recognize the road end, it is unnecessary to distinguish the slope portion from the road-outside region (the lower-level region) in this embodiment. Hence, all regions having heights (height-levels) different from a height (level) of the road surface are treated as the road-outside region. That is, hereinafter, the slope portion is also referred to as the road-outside region. Therefore, a point (spot) 901 is recognized as being in an end portion of the road region (road-inside region), and that a point (spot) 902 of the road-outside region is recognized as a nearest point to the road. Therefore, it can be estimated that an actual end of the road exists between the point 901 and the point 902.

(Accuracy Improvement of Road End Recognition)

In the case that the road is connected (linked) with the lower-level region through a slope portion having a gentle gradient, an image of this slope portion is can be picked up by the camera so that a distance information of the slope portion can be obtained. Thereby, it can be detected that this slope portion is unsuitable for vehicle running. Moreover, a boundary between the slope portion and the road portion can be regarded as a road boundary (i.e., road end).

Even if the lower-level region cannot be detected, for example, in a case that the lower-level region is significantly lower than the road (e.g., a road constructed at a bluff), or in a case that the lower-level region is not clear in contrast; it can be determined that this lower-level region is not the road (i.e., is not the road-inside region).

There is a possibility that the detected road end has a detection error as compared with an actual end of the road. Moreover, there is a possibility that the actual road end has a fragile substructure and hence it is improper that the vehicle runs on the road end. As a countermeasure, for example, a more inside location of the road than the detected road end by a proper degree may be outputted as a modified road end. It is noted that the more inside location of the road than the detected road end corresponds to a second predetermined location according to the present invention. On the contrary, in the case that this running-environment recognition apparatus is combined with the lane-departure prevention control as the first embodiment, a more outside location of the road than the detected road end by a proper degree may be to outputted as the modified road end in order to suppress an excessive control or excessive warnings.

(Countermeasure at the Time of Generating False Image)

When trying to extract and determine the region lower than the road as the road-outside region, there is a possibility that a false image reflected on a puddle of the road is detected. In such a case, since this false image is located below the road surface in dummy appearance, there is a risk that the puddle of the road is erroneously recognized as being lower than the road surface. Therefore, in this embodiment, the puddle is distinguished from the region actually lower than the road surface and is not determined as the region actually lower than the road surface, by use of the following characteristics of the false image reflected on the puddle which are different from characteristics of real image.

(a) Because the false image is constituted by a faraway object(s), a road-surface portion of the taken image which is recognized as having a distance shorter than an apparent distance of the false image is viewed in a frontward area of a false-image portion of the taken image.

(b) Because a water surface of the puddle is not completely flat, there is a case where the false image is greatly distorted so that a distance information is dispersed in the puddle region.

(c) When the water surface of the puddle is not stable, an apparent location of the false image varies with lapse of time.

(d) Object(s) existing on the road apparently exists also at a location symmetrical to this object(s) with respect to the road surface (water surface).

(e) In a case of false image of a traveling vehicle, this traveling vehicle moves despite the traveling vehicle is regarded as existing below the road surface. There is an extremely low possibility that this phenomenon occurs in a case of real image.

By detecting such characteristics of false image, a region of false image can be determined, i.e., can be distinguished from a region of real image.

Some technical structures obtainable from the above first embodiment according to the present invention will now be listed with their advantageous effects.

[a] A running-environment recognition apparatus comprising: an information recognition section (e.g., the camera 310) mounted in a vehicle and configured to recognize an information of at least a frontward region of the vehicle relative to a traveling direction of the vehicle; and a road-surface calculating section (e.g., the running-environment recognition system 1, 100) configured to calculate a road surface of a traveling road and a portion lower than the road surface in the frontward region of the vehicle, from the information recognized by the information recognition section (e.g., 310). According to such a structure, a location lower than the road surface can be detected, so that the information of the frontward region in the traveling direction of the vehicle can be accurately recognized.

[b] The running-environment recognition apparatus as described in the item [a], wherein the information recognition section (e.g., 310) is a camera configured to take an image of the frontward region of the vehicle relative to the traveling direction of the vehicle. According to such a structure, a running environment ahead of the vehicle can be recognized as an image.

[c] The running-environment recognition apparatus as described in the item [b], wherein the information recognition section (e.g., 310) is a stereo camera including a plurality of cameras (e.g., 310a, 310b) configured to measure a distance by means of a parallax that is caused when the plurality of cameras (e.g., 310a, 310b) take respective images of an identical object, and the information is related to distance. According to such a structure, a distance to an obstruction ahead of the vehicle and a condition of the road surface can be grasped based on the distance information.

[d] The running-environment recognition apparatus as described in the item [c], wherein the road-surface calculating section (e.g., 1, 100) is configured to recognize a first area (road-inside region) having a first visually-characteristic point and a second area (road-outside region) having a second visually-characteristic point from the information related to distance, and to calculate the road surface and the portion lower than the road surface, in relation to the recognized respective first and second areas. According to such a structure, the road surface and the portion lower than the road surface are recognized from both of the visually-characteristic point and the distance information. Thereby, an accuracy of recognition can be enhanced.

[e] The running-environment recognition apparatus as described in the item [d], wherein the respective first and second areas are directly continuous with each other, wherein the road-surface calculating section (e.g., 1, 100) is configured to calculate a location (e.g., 601, 901) corresponding to a boundary portion between the first and second areas, as an end of the road surface. According to such a structure, the end of the road can be recognized with high precision.

[f] The running-environment recognition apparatus as described in the item [e], wherein the road-surface calculating section (e.g., 1, 100) may calculate a second predetermined location existing between a first predetermined location of the first area and the location corresponding to the boundary portion, as the end of the road surface According to such a structure, a danger resulting from a weakness of understructure of the road end can be avoided.

[g] The running-environment recognition apparatus as described in the item [d], wherein the road-surface calculating section (e.g., 1, 100) includes a distance-data accumulation section (e.g., data ROM 340) configured to store the information on distance at predetermined intervals, wherein the road-surface calculating section (e.g., 1, 100) is configured to recognize the first and second areas by superimposing a plurality of stored distance data on each other. According to such a structure, the recognition accuracy can be improved.

[h] The running-environment recognition apparatus as described in the item [g], wherein if a part of a current-time-around data is different from that of a previous-time-around data when the plurality of stored distance data are superimposed on each other, the road-surface calculating section (e.g., 1, 100) recognizes the first and second areas on the basis of the part of the current-time-round data. According to such a structure, the recognition accuracy can be improved because of the usage of the newer data.

[i] The running-environment recognition apparatus as described in the item [g], wherein if a part of a current-time-around data is different from that of a previous-time-around data when the plurality of stored distance data are superimposed on each other, the road-surface calculating section (e.g., 1, 100) recognizes the first and second areas on the basis of an average of the part of the current-time-around data and the part of the previous-time-around data. According to such a structure, a stable recognition can be attained since an influence of a disturbance and the like included in the data is removed.

[Second Embodiment]

Next, a second embodiment according to the present invention will now be explained. Since a basic structure of the second embodiment is similar as the first embodiment, only different parts from the first embodiment will be explained. Although the running environment recognition apparatus is combined with the lane-departure prevention control system in the first embodiment, a running environment recognition apparatus is simply combined with a warning system for giving only a warning in the second embodiment. Moreover, although the stereo camera 310 is used in the first embodiment, a single camera is used in the second embodiment.

FIG. 19 is a systematic structural view of a vehicle equipped with a running-environment recognition system in the second embodiment. A running-environment recognition system 100 includes the single camera 310 as the image-pickup means, and thereby, recognizes an environment around the host vehicle. It is noted that the single camera 310 corresponds to the information recognition section according to the present invention. The running-environment recognition system 100 recognizes an image-position difference of a measured identical spot between in a plurality of images taken by the single camera 310 at timings different from each other, and thereby, recognizes or determines an actual location (distance) of the spot. That is, when comparing the plurality of images taken by the camera 310 with each other, a point which is actually located near the vehicle moves between the images at a high speed (i.e., has a large positional difference between in one of the plurality of images and in another of the plurality of images), and a point which is actually located away from the vehicle moves between the images at a low speed, with an actual movement of the vehicle. From such a fact, the actual distance and direction to the measured point can be known. Thereby, a three-dimensional shape of the environment picked up by the camera 310 can be recognized.

The running-environment recognition system 100 includes a RAM 320, a CPU 330, a data ROM 340 and a program ROM 350. The RAM 320 memorizes the images picked up by the camera 310. The CPU 330 performs arithmetic processing. The data ROM 340 stores various data. The program ROM 350 stores programs of the recognition processing. The camera 310 is attached to a rearview mirror mounted in an interior of the vehicle. The camera 310 takes (picks up) an image of frontward ambience of the vehicle at a predetermined depression angle from the predetermined attachment location of this camera 310. The vehicle-frontward-region image taken by the camera 310 is inputted into the RAM 32. Then, a lane(s) and a three-dimensional object(s) existing ahead of the vehicle are detected from the vehicle-frontward-region images, and a shape of road is estimated from the vehicle-frontward-region images. It is noted that the running-environment recognition system 100 corresponds to the road-surface calculating section according to the present invention.

The running-environment recognition system 100 is connected (communicated) with a controller 200 for controlling a warning system, and also connected with a display device 115 for displaying various images and information. This display device 115 is mounted in the vehicle interior. Moreover, the controller 200 is connected with a speaker 119, an ignition switch 120 and a start-up switch 121. The speaker 119 generates a warning sound when the host vehicle is at risk of colliding with an obstruction. The ignition switch 120 is turned on when an engine is started. The start-up switch 121 starts up or activates the warning system.

Although the recognition processing is carried out from the images taken by the left and right cameras in the first embodiment, the recognition processing is carried out from the images taken by one camera at mutually-different timings in the second embodiment. Because the other basic recognition logics are same as those of the first embodiment, the explanations thereof will be omitted for the purpose of simplification of the disclosure. Hence, only different parts from the first embodiment will now be explained.

(Accuracy Improvement of Image Processing)

In a case that the road-inside region or the road-outside region is completely homogeneous in vision, it is difficult to extract spots belonging to the identical region (for a purpose of region differentiation) from the respective timing-different images taken by the single camera 310. As explained above referring to FIG. 13, actually, multiple visually-characteristic points exist in the road, the road-outside region, and the boundary region formed between the road and the road-outside region. Hence, the timing-different images taken by the single camera 310 are compared with each other about each characteristic point, and thereby, a direction and a distance to the each characteristic point from the camera 310 are calculated. Thereby, a location of each characteristic point can be obtained. Accordingly, an aggregation of characteristic points actually existing on the road can be recognized as lying substantially in a same plane, and also, characteristic points actually existing on the region lower than the road can be recognized as being located in the road-outside region.

(Superposition Processing)

In order to obtain the shape of road surface, the characteristic parts such as traffic marking paints, small cracks of asphalt and tire trails which exist in the road surface are extracted from the vehicle-frontward images taken by the camera 310. Then, a distance of each of the extracted characteristic parts from the camera 310 is measured by a location difference (deviation) of the each characteristic part between in the plurality of timing-different images taken by the single camera 310. However, such characteristic parts do not necessarily exist evenly in whole of the road surface. Moreover, even if such characteristic parts exist evenly in whole of the road surface, it is not clear that these characteristic parts are always able to be detected. In the same manner, also in the region lower than the road surface, it is not clear that the characteristic parts are always able to be detected in whole of the region lower than the road surface. Hence, it is necessary to further improve the accuracy. Therefore, in this embodiment, the obtained distance data is accumulated in the data ROM 340. This accumulated distance data is superimposed on a distance data obtainable by an image that is taken at a next-time around (next timing) or later. It is noted that the data ROM 340 corresponds to the distance-data accumulation section according to the present invention. FIG. 20 is a schematic view showing a superposition processing of the image data (distance information) in the second embodiment. Since the images taken at timings different from each other are necessary to recognize a distance of each spot in the case of single camera 310, the following procedure is conducted in this second embodiment. That is, in a last-time control period, a distance data was calculated by using a difference between respective spots recognized from an image taken in a before-last-time control period (i.e., last control period but one) and the corresponding spots recognized from an image taken in the last-time control period. Then, the calculated distance data of the last-time control period was stored. Next, in a current control period, a distance data is calculated by using a difference between respective spots recognized from an image taken in the last-time control period and the corresponding spots recognized from an image taken in the current-time control period. Then, the calculated distance data of the current-time control period is stored. Then, the stored distance data of the current-time control period is superimposed on the stored distance data of the last-time control period. Thereby, some parts at which any distance information could not obtained in the last-time control period become able to have those distance information since those distance information is newly obtained in the current-time control period. Thereby, a detection accuracy of the road and the surrounding environment can be enhanced. As shown in FIG. 20, even if the host vehicle is moving, a plurality of images obtained with time include a same region (i.e., overlapped region) in a case where the vehicle speed is relatively low, i.e., in a case where a vehicle movement between two photographing timings is relatively short. Therefore, the information about such an overlapped region is superimposed among the plurality of images obtained with time. In this embodiment, the number of superimpositions is not limited to two times. A possible many number of superimpositions is effective.

Some technical structures obtainable from the above second embodiment according to the present invention will now be listed with their advantageous effects.

[j] The running-environment recognition apparatus as described in the item [b], wherein the information recognition section (e.g., 310) is a single camera, wherein the road-surface calculating section (e.g., 1, 100) is configured to calculate a height difference in the taken image, in accordance with a difference of inter-image moving speed of photographed object that is caused between in a region close to the single camera and in a region away from the single camera. According to such a structure, the running environment ahead of and near the vehicle can be recognized efficiently by a low number of cameras.

(Other Embodiments)

Although the invention has been described above with reference to the first and second embodiments of the invention, the invention is not limited to the embodiments described above. Modifications and variations of the embodiments described above will occur to those skilled in the art in light of the above teachings.

For example, although the camera(s) is used as the information recognition section in the first and second embodiments, a laser radar (lidar) or a millimeter-wave radar may be employed as the information recognition section. In such a case, an information on distance that is obtained by waves reflected from a road surface and a region lower than the road surface ahead of the host vehicle can be used. Moreover, the above-mentioned various systems can be appropriately combined with each other according to the present invention.

Some technical structures obtainable from the above embodiments according to the present invention will now be listed with their advantageous effects.

[k] The running-environment recognition apparatus as described in the item [a], wherein the information recognition section (e.g., 310) is a laser radar or a millimeter-wave radar, and the information is related to distance and is obtained by a reflected wave from the road surface and the portion lower than the road surface in the frontward region of the vehicle. According to such a structure, the distance information can be obtained without being influenced by a sunlight or the like.

[l] A running-environment recognition apparatus comprising: a camera (e.g., 310) mounted in a vehicle and configured to recognize an environment of a frontward region of the vehicle relative to a traveling direction of the vehicle; and a road-surface calculating section (e.g., 1, 100) configured to calculate a boundary portion between a road surface of a traveling road and a portion lower than the road surface around the traveling road, by use of a distance data obtained based on a distance to each object existing in the frontward region of the vehicle from the environment recognized by the camera (e.g., 310). According to such a structure, a location lower than the road surface can be detected, so that the information of the frontward region in the traveling direction of the vehicle can be accurately recognized.

[m] The running-environment recognition apparatus as described in the item [l], wherein the camera (e.g., 310) is a stereo camera including a plurality of cameras (e.g., 310a, 310b) configured to measure the distance by means of a parallax that is caused when the plurality of cameras (e.g., 310a, 310b) take respective images of an identical object, and the environment is an information related to distance. According to such a structure, a distance to an obstruction ahead of the vehicle and a condition of the road surface can be grasped based on the distance information.

[n] The running-environment recognition apparatus as described in the item [m], wherein the road-surface calculating section (e.g., 1, 100) is configured to recognize a first area having a first visually-characteristic point and a second area having a second visually-characteristic point from the information related to distance, and to calculate the road surface and the portion lower than the road surface, in relation to the recognized respective first and second areas. According to such a structure, the road surface and the portion lower than the road surface are recognized from both of the visually-characteristic point and the distance information. Thereby, the accuracy of recognition can be improved.

[o] The running-environment recognition apparatus as described in the item [n], wherein the respective first and second areas are directly continuous with each other, wherein the road-surface calculating section (e.g., 1, 100) is configured to calculate a location (e.g., 601, 901) corresponding to a boundary portion between the first and second areas, as an end of the road surface. According to such a structure, the end of the road can be recognized with high precision.

[p] The running-environment recognition apparatus as described in the item [n], wherein the road-surface calculating section (e.g., 1, 100) is configured to estimate a second predetermined location existing between a first predetermined location in the first area and the location corresponding to the boundary portion between the first and second areas, as the end of the road surface. According to such a structure, a danger resulting from a weakness of understructure of the road end can be avoided.

[q] The running-environment recognition apparatus as described in the item [p], wherein the road-surface calculating section (e.g., 1, 100) includes a distance-data accumulation section (e.g., 340) configured to store the information on distance at predetermined intervals, wherein the road-surface calculating section (e.g., 1, 100) is configured to recognize the first and second areas by superimposing a plurality of stored distance data on each other. According to such a structure, the recognition accuracy can be improved.

[r] The running-environment recognition apparatus as described in the item [q], wherein if a part of a current-time-around data is different from that of a previous-time-around data when the plurality of stored distance data are superimposed on each other, the road-surface calculating section (e.g., 1, 100) recognizes the first and second areas on the basis of the part of the current-time-round data. According to such a structure, the recognition accuracy can be improved because of the usage of the newer data.

[s] The running-environment recognition apparatus as described in the item [r], wherein if a part of a current-time-around data is different from that of a previous-time-around data when the plurality of stored distance data are superimposed on each other, the road-surface calculating section (e.g., 1, 100) recognizes the first and second areas on the basis of an average of the part of the current-time-around data and the part of the previous-time-around data. According to such a structure, a stable recognition can be attained since an influence of a disturbance and the like included in the data is eliminated.

[t] A running-environment recognition apparatus comprising: a stereo camera (e.g., 310) including a plurality of cameras (e.g., 310a, 310b) mounted in a vehicle and configured to obtain an image information including a road surface of a traveling road existing in a frontward region of the vehicle relative to a traveling direction of the vehicle, wherein the stereo camera (e.g., 310) is configured to measure a distance in the image information by means of a parallax that is caused when the plurality of cameras (e.g., 310a, 310b) take respective images of an identical object; and a road-surface calculating section (e.g., 1, 100) configured to recognize a first area that is the road surface of the traveling road and a second area that is a portion lower than the road surface around the traveling road, by use of the distance information measured by the stereo camera (e.g., 310), wherein the road-surface calculating section (e.g., 1, 100) is configured to calculate a boundary portion between the first and second areas as an end of the traveling road. According to such a structure, a location lower than the road surface can be detected, so that the information of the frontward region in the traveling direction of the vehicle can be accurately recognized. Moreover, a distance to an obstruction ahead of the vehicle and a condition of the road surface can be grasped based on the distance information. Moreover, since the road surface and the portion lower than the road surface are recognized from both of the visually-characteristic point and the distance information, the accuracy of recognition can be improved. Moreover, the road end can be accurately recognized.

This application is based on prior Japanese Patent Application No. 2010-272104 filed on Dec. 7, 2010. The entire contents of this Japanese Patent Application are hereby incorporated by reference.

The scope of the invention is defined with reference to the following claims.

What is claimed is:

1. A running-environment recognition apparatus comprising:
    an information recognition section mounted in a vehicle and configured to recognize an information of at least a frontward region of the vehicle relative to a traveling direction of the vehicle; and
    a road-surface calculating section configured
        to calculate a road surface of a traveling road and a portion lower than the road surface in the frontward region of the vehicle, from the information recognized by the information recognition section, the information comprising a plurality of first visually-characteristic points existing in the road surface and a plurality of second visually-characteristic points existing in the portion lower than the road surface, and
        to recognize a boundary portion between the plurality of first visually-characteristic points and the plurality of second visually-characteristic points as a boundary portion between the road surface and the portion lower than the surface,
    wherein the recognized boundary portion is an end of the traveling road.

2. The running-environment recognition apparatus according to claim 1, wherein
    the information recognition section is a camera configured to take an image of the frontward region of the vehicle relative to the traveling direction of the vehicle.

3. The running-environment recognition apparatus according to claim 2, wherein
    the information recognition section is a stereo camera including a plurality of cameras configured to measure a distance by means of a parallax that is caused when the plurality of cameras take respective images of an identical object, and
    the information is related to distance.

4. The running-environment recognition apparatus according to claim 3, wherein the road-surface calculating section is configured
    to recognize a first area having a first visually-characteristic point and a second area having a second visually-characteristic point from the information related to distance, and
    to calculate the road surface and the portion lower than the road surface, in relation to the recognized respective first and second areas.

5. The running-environment recognition apparatus according to claim 4,
    wherein the respective first and second areas are directly continuous with each other,
    wherein the road-surface calculating section is configured to calculate a location corresponding to a boundary portion between the first and second areas, as an end of the road surface.

6. The running-environment recognition apparatus according to claim 5, wherein
    the road-surface calculating section is configured to calculate a second predetermined location existing between a first predetermined location of the first area and the location corresponding to the boundary portion, as the end of the road surface.

7. The running-environment recognition apparatus according to claim 4,
    wherein the road-surface calculating section includes a distance-data accumulation section configured to store the information on distance at predetermined intervals,
    wherein the road-surface calculating section is configured to recognize the first and second areas by superimposing a plurality of stored distance data on each other.

8. The running-environment recognition apparatus according to claim 7, wherein
    if a part of a current-time-around data is different from that of a previous-time-around data when the plurality of stored distance data are superimposed on each other, the road-surface calculating section recognizes the first and second areas on the basis of the part of the current-time-round data.

9. The running-environment recognition apparatus according to claim 7, wherein
if a part of a current-time-around data is different from that of a previous-time-around data when the plurality of stored distance data are superimposed on each other, the road-surface calculating section recognizes the first and second areas on the basis of an average of the part of the current-time-around data and the part of the previous-time-around data.

10. The running-environment recognition apparatus according to claim 2,
wherein the information recognition section is a single camera,
wherein the road-surface calculating section is configured to calculate a height difference in the taken image, in accordance with a difference of inter-image moving speed of photographed object that is caused between in a region close to the single camera and a region away from the single camera.

11. The running-environment recognition apparatus according to claim 1, wherein
the information recognition section is a laser radar or a millimeter-wave radar, and
the information is related to distance and is obtained by a reflected wave from the road surface and the portion lower than the road surface in the frontward region of the vehicle.

12. A running-environment recognition apparatus comprising:
a camera mounted in a vehicle and configured to recognize an environment of a frontward region of the vehicle relative to a traveling direction of the vehicle; and
a road-surface calculating section configured
to calculate a boundary portion between a road surface of a traveling road and a portion lower than the road surface around the traveling road, as an end of the traveling road, based on distance data obtained in relation to a distance to each object existing in the frontward region of the vehicle from the environment recognized by the camera, the distance data comprising a plurality of first visually-characteristic points existing in the road surface and a plurality of second visually-characteristic points existing in the portion lower than the road surface, and
to recognize a boundary portion between the plurality of the first visually-characteristic points and the plurality of second visually-characteristic points as the boundary portion between the road surface and the portion lower than the road surface.

13. The running-environment recognition apparatus according to claim 12, wherein
the camera is a stereo camera including a plurality of cameras configured to measure the distance by means of a parallax that is caused when the plurality of cameras take respective images of an identical object, and
the environment is an information related to distance.

14. The running-environment recognition apparatus according to claim 13, wherein the road-surface calculating section is configured
to recognize a first area having a first visually-characteristic point and a second area having a second visually-characteristic point from the information related to distance, and
to calculate the road surface and the portion lower than the road surface, in relation to the recognized respective first and second areas.

15. The running-environment recognition apparatus according to claim 14,
wherein the respective first and second areas are directly continuous with each other,
wherein the road-surface calculating section is configured to calculate a location corresponding to a boundary portion between the first and second areas, as an end of the road surface.

16. The running-environment recognition apparatus according to claim 14, wherein
the road-surface calculating section is configured to estimate a second predetermined location existing between a first predetermined location in the first area and the location corresponding to the boundary portion between the first and second areas, as the end of the road surface.

17. The running-environment recognition apparatus according to claim 16,
wherein the road-surface calculating section includes a distance-data accumulation section configured to store the information on distance at predetermined intervals,
wherein the road-surface calculating section is configured to recognize the first and second areas by superimposing a plurality of stored distance data on each other.

18. The running-environment recognition apparatus according to claim 17, wherein
if a part of a current-time-around data is different from that of a previous-time-around data when the plurality of stored distance data are superimposed on each other, the road-surface calculating section recognizes the first and second areas on the basis of the part of the current-time-round data.

19. The running-environment recognition apparatus according to claim 17, wherein
if a part of a current-time-around data is different from that of a previous-time-around data when the plurality of stored distance data are superimposed on each other, the road-surface calculating section recognizes the first and second areas on the basis of an average of the part of the current-time-around data and the part of the previous-time-around data.

20. A running-environment recognition apparatus comprising:
a stereo camera including a plurality of cameras mounted in a vehicle and configured to obtain an image information including a road surface of a traveling road existing in a frontward region of the vehicle relative to a traveling direction of the vehicle,
wherein the stereo camera is configured to measure a distance in the image information by means of a parallax that is caused when the plurality of cameras take respective images of an identical object; and
a road-surface calculating section configured to recognize a first area that is the road surface of the traveling road and a second area that is a portion lower than the road surface around the traveling road, by use of the distance information measured by the stereo camera, the distance information comprising a plurality of first visually-characteristic points existing in the first area and a plurality of second visually-characteristic points existing in the second area,
wherein the road-surface calculating section is configured to recognize a boundary portion between the plurality of first visually-characteristic points and the plurality of second visually-characteristic points as the boundary portion between the first and second areas,
wherein the recognized boundary portion is an end of the traveling road.

21. The running-environment recognition apparatus according to claim 1, wherein
the road-surface calculating section is configured to collect the plurality of first visually-characteristic points and the plurality of second visually-characteristic points by superimposing a plurality of time-different images of the information on each other.

22. The running-environment recognition apparatus according to claim 1, wherein
the road-surface calculating section is configured to recognize a slope portion linking the road surface and the portion lower than the road surface as being unsuitable for running the vehicle.

23. The running-environment recognition apparatus according to claim 1, wherein
the road-surface calculating section is configured to determine that a lower-level region that is substantially lower than the road surface or that is in unclear contrast is not the road surface.

24. The running-environment recognition apparatus of claim 1, wherein the road-surface calculating section is configured to
calculate a modified end of the traveling road that is closer to an inner portion of the traveling road than the end of the traveling road recognized as the boundary portion, and
counteract a detection error in the recognition of the boundary portion by treating the modified end of the traveling road as the end of the traveling road.

25. The running-environment recognition apparatus of claim 1, wherein the road-surface calculating section is configured to
calculate a modified end of the traveling road that is closer to an outer portion of the traveling road than the end of the traveling road recognized as the boundary portion, and
suppress excessive control of vehicle movement or excessive warnings by treating the modified end of the traveling road as the end of the traveling road.

* * * * *